United States Patent Office 3,010,765
Patented Nov. 28, 1961

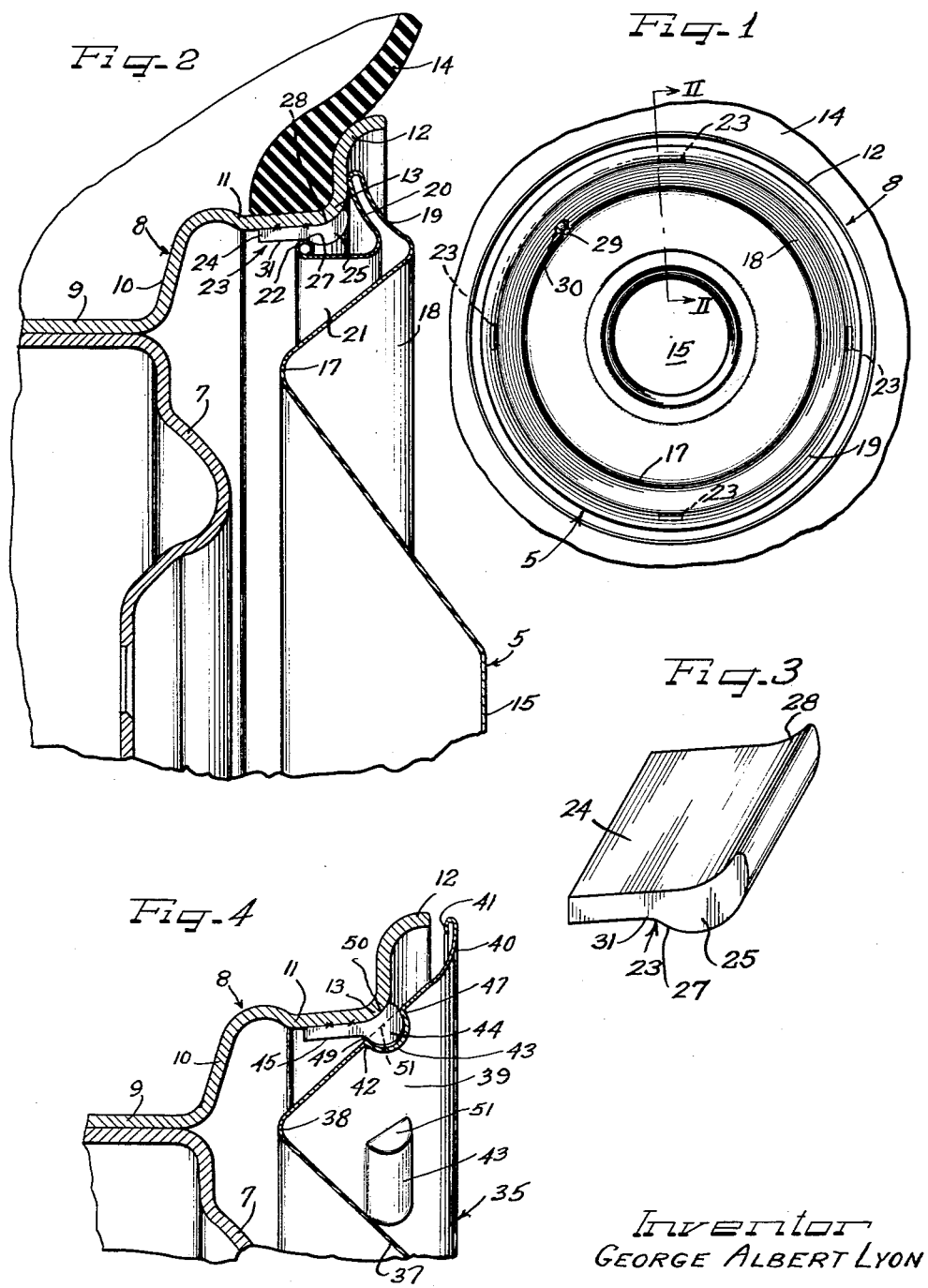

3,010,765
WHEEL COVER
George Albert Lyon, 13881 W. Chicago Blvd.,
Detroit 28, Mich.
Filed June 14, 1957, Ser. No. 665,832
6 Claims. (Cl. 301—37)

The present invention relates to improvements in wheel structures and more particularly concerns the ornamental and protective covering of the outer sides of vehicle wheels.

Currently tubeless tires are in vogue wherein the tire rim comprises the inner wall of the air chamber provided by the tire. It is therefore highly important that the tire rim especially in the air chamber wall portion thereof and in the area where the tire joins the rim be entirely free from any cracks or breaks through which leakage may occur. In addition, it is important that there be a complete and thorough sealing engagement between the bead portions of the tire and the engaged surfaces of the tire rim, without any grooves or irregularities through which air may leak past the tire bead from the air chamber.

An important object of the present invention is to provide improved means on a tire rim for supporting a tubeless tire affording the functional equivalent of a cover retaining bump of the type ordinarily pressed from the tire rim, but according to the present invention comprising novel means attached to the tire rim.

Another object of the invention is to provide improved means on a tire rim for press-on, pry-off engagement thereof by retaining flange structure of a wheel cover.

A further object of the invention is to provide improved means in the form of a lug structure adapted to be secured as by welding to a tire rim for retaining a cover in position on a vehicle wheel.

Other objects, features and advantages of the present invention will be readily apparent from the following detailed description of certain preferred embodiments thereof taken in conjunction with the accompanying drawing, in which:

FIGURE 1 is an outer side elevational view of a wheel structure embodying features of the invention;

FIGURE 2 is an enlarged fragmentary radial sectional detail view taken substantially on the line II—II of FIGURE 1;

FIGURE 3 is an isometric view of one of the cover retaining lug members attachable to the tire rim for retaining the cover in place on the wheel; and FIGURE 4 is a radial sectional detail view similar to FIGURE 2 but showing a modification.

A wheel cover 5 is adapted to be applied to the outer side of a vehicle wheel comprising a wheel body 7 carrying a tire rim 8 including a base flange 9 to which the wheel body is attached and merging with an outer side flange 10 that extends generally radially outwardly and faces generally axially outwardly. Joined to the radially outer portion of the flange 10 is a generally axially outwardly and radially inwardly facing intermediate flange 11 from which extends generally radially and axially outwardly a terminal flange 12 joined to the intermediate flange on a rounded shoulder 13. The tire rim 8 thus provides a multi-flange, drop center structure adapted to support a tubeless pneumatic tire 14 and provide with the tire an air chamber.

The cover 5 comprises a full disk circular member adapted to be made from suitable sheet material such as stainless steel, brass, aluminum alloy, or the like pressed or stamped to form by suitable drawing die equipment. In the present instance the cover 5 comprises a central crown portion 15 about which is an inwardly dished annular portion 17 provided with a generally radially and axially outwardly sloping radially outer wall portion 18 that merges with a generally axially inwardly and radially outwardly directed marginal portion 19 for overlying the tire rim and more particularly the radially extending portion of the terminal flange 12. An underturned integral flange 20 behind the marginal portion 19 is adapted to bottom against the terminal flange radially outwardly from the juncture shoulder 13 and extends generally radially inwardly and axially outwardly to a substantial distance radially inwardly beyond the inner diameter of the intermediate flange 11, but short of the cover portion 18. From the inner extremity of the underturned flange 20 extends an annular axially inwardly projecting continuous flange 21 having a turned inner terminal extremity in the form of a resilient retaining bead 22 extending axially inwardly to a distance that brings it opposite the axially outer portion of the intermediate flange 11 and in spaced relation thereto. That is, when the cover is in place on the wheel and with the axially inwardly extending flange 21 generally telescoped into the intermediate flange 11, the terminal bead 22 is of a diameter to remain in spaced relation to the intermediate flange portion which it opposes.

Means for press-on, pry-off retaining engagement by the cover bead 22 comprise a circumferentially spaced series of retaining projections 23 carried by the tire rim and constructed and arranged to be mounted upon and attached to the tire rim in a manner to avoid any channeling, grooving, embossing, aperturing or otherwise interfering with the tire engageable and air chamber surfaces of the tire rim. To this end, the retaining projections 23 comprise metal lugs formed from material such as mild steel adapted for attachment as by welding, brazing or the like to the tire rim. Each of the lugs 23 includes a body plate or flange portion 24 (FIGS. 2 and 3) of substantial thickness, width, and length and adapted to be secured to the radially inner face of the intermediate flange 11 of the tire rim adjacent to but spaced axially inwardly from the juncture shoulder 13. One end margin of the retaining lug member is constructed and arranged to be disposed in generally opposed relation to the rim juncture shoulder 13 and is provided with a retaining shoulder projection 25 which in the assembled relationship with the tire rim projects generally radially inwardly beyond the surface of the lug body 24 that faces radially inwardly. At its axially inner side the projection 25 provides a generally radially and axially inwardly facing retaining shoulder 27. In this instance the projection 25 is in the form of a rib-like head extending from side-to-side of the lug member 23, and of uniformly curved contour transversely thereof in the axial assembled direction, that is from the axially outer extremity thereof through the shoulder 27 to juncture with the plane of the radially inwardly facing surface of the lug body 24, with a substantial portion of the lug body extending axially inwardly beyond the shoulder 27.

In order to facilitate alignment of the retaining lug member 23 with the rim flanges and proper axial disposition, the head end portion of the lug member on the face thereof which opposes the tire rim is preferably generally conformed complementary to the rim juncture shoulder 13 in a more or less fillet-like, curved manner to provide a locating and rim shoulder engaging groove surface 28. Assembly of the lug member 23 with the tire rim is effected by placing the lug member into generally nested, hugging relation to the tire rim with the groove portion 28 orienting the lug member with respect to its axial disposition by engaging the rim shoulder 13, and the body flange portion 24 engaging the rim flange 11 to which the body flange 24 may then be welded, preferably by spot welding.

There may be as many of the retaining lug members 23 as preferred, four being a desirable number equidistantly spaced circumferentially, although a smaller or larger number may be used if desired. By having all of the retaining lug members 23 of substantially identical construction, the retaining projecting portions 25 and more particularly the retaining shoulders 27 will all be disposed on a common circle in the assembly with the wheel. In a desirable manner of attaining uniformity, the retaining lug members 23 may be derived from a rolled or extruded strip or bar from which suitable sections to provide the respective lug members 23 are severed.

The construction and relationship of the retaining flange and bead structure 21, 22 of the cover and the retaining shoulders 27 of the retaining lug members are such that when the retaining bead 22 is in engagement with the retaining shoulders 27, the radially outer extremity of the cover is drawn firmly into seated or bottomed relation against the terminal flange of the tire rim. This is effected by having the retaining shoulders 27 of the retaining lug members disposed slightly further axially inward than the retaining terminal bead 22 of the cover is disposed axially inward relative to the seating shoulder provided by the underturned flange 20 of the cover.

In addition, the radially inward extent or projection of the retaining lug body 24 as determined by its thickness adjacent to the retaining shoulder 27 is such as to lie on a diameter that is slightly smaller than the diameter of the retaining terminal bead 22 at its radially outermost portion. As a result, the advantages are attained which are attributed to the frictional interlock shoulders at the axially inner sides of the retaining bumps in my Patent 2,607,633, issued August 19, 1952, without, however, the disadvantages with respect to tubeless tires of the grooving of the tire bead opposing portion of the intermediate flange of the tire rim. Through this arrangement, the frictional interlock shoulders provided by the radially inward projecting thickness of the lug body flange portions 24 lying on a circle which is of slightly smaller diameter than the undeflected outer side diameter of the retaining flange bead 22 cause the bead to be radially inwardly deflected and thus under substantial resilient tension, with the portions of the bead intermediate the retaining lugs resiliently deflected generally radially outwardly to compensate for the inward deflection at the lugs. Nevertheless, such intermediate portions of the retaining bead remain out of any functional engagement with the tire rim intermediate flange 11 and preferably remain in spaced relation thereto. As a result of this radially deflected tensioned interengagement of the retaining bead with the retaining lugs substantial resistance to turning of the cover on the wheel is assured. This is especially advantageous for retaining the cover against torsional displacement and thus disalignment of a valve stem 29 with respect to a valve stem aperture 30 in the dished portion 17 of the cover.

By having the side edges of the retaining lug body flange portions 24 at the radially inner tensioning interlock shoulder faces thereof provided with substantially sharp corners 31 at each side of the retaining lug, a more or less biting turn-preventing supplemental interengagement of the retaining bead 22 with the retaining lugs is attained. In other words, the attached retaining lugs 23 of the present invention, in addition to the other advantages enumerated, effect an even more secure turn-preventing engagement with the cover bead than in the pressed or embossed form of retaining projection shown in my aforesaid patent.

In applying the cover 5 to the outer side of the wheel, the valve stem 29 is registered through the valve stem aperture 30, and this may engage the retaining bead 22 in preliminary fashion behind the retaining shoulders 27 of the two adjacent retaining lug members 23 between which the valve stem 29 is located. Then, by pressing the opposite side of the cover axially inwardly, the retaining bead 22 is cammed over the rounded retaining nose bulge 25 of the retaining lug and then snaps into engagement axially inwardly behind and with the retaining shoulders 27 of the remaining retaining lugs. When the retaining bead 22 has retainingly engaged all of the retaining shoulders 27, the bead assumes a uniform or equalized tensioned, locally resiliently deflected relationship to all of the retaining lugs and with the underturned flange 20 of the cover firmly drawn against and into bottomed relation to the terminal flange 12 adjacent to the juncture 13.

For removing the cover 5 from the outer side of the wheel, a pry-off tool such as a screwdriver or the like is inserted behind the edge of the cover and pry-off leverage applied thereto for resiliently flexibly camming the retaining bead 22 from the adjacent one or two retaining shoulders 27.

In the modification of FIGURE 4, the wheel is of substantially the same construction as in FIGURE 2 and therefore similar reference numerals identify identical parts. However, in this modification a cover 35 is provided of a more economical form, made from suitable sheet material and including a central or crown portion 37, with an intermediate annular inwardly dished portion 38 at the radially outer side of which is a generally radially and axially outwardly oblique annular cover flange portion 39 merging with a generally radially outwardly turned marginal portion 40 having an underturned reinforcing and finishing flange 41 which is quite short and more or less provides a bead at the edge of the cover. The diameter of the cover may be such as to substantially entirely cover the wheel inclusive of the terminal flange 12 with the edge 41 lying opposite the tip of the terminal flange lip in spaced relation and with the marginal portion 40 providing with the terminal flange a substantial chamber within which wheel balancing weights may be accommodated in substantially concealed relation.

For press-on, pry-off retention of the cover 35 on the wheel, the cover is provided with cover retaining shoulder means in the form of respective shoulders 42 facing generally radially and axially outwardly at the axially inner sides of respective outward embossments 43 providing inwardly opening sockets receptive of respective shouldered heads 44 of retaining lug members 45 carried by the tire rim.

In general construction, the retaining lug members 45, of which there may be as many as preferred circumfertially spaced apart, are of substantially similar construction to the retaining lug members 23 except that the retaining shoulder heads 44 of the retaining lug members 45 are of a more pronounced projecting form and somewhat narrower and adapted not only to effect retaining interengagement with the respective cover shoulders 42 but also supporting engagement with respective shoulders 47 provided at the radially and axially outward sides of the embossment sockets or pockets. For this purpose the shoulder head 44 in each instance includes a generally radially and axially inwardly facing shoulder 49 and an opposite crown shoulder for engagement respectively by the retaining shoulder 42 and the seating shoulder 47 of the cover. Actually the retaining shouldered head 44 is thus retainingly gripped between the cover shoulders 42 and 47 and the cover is entirely supported by the shouldered head 44 of the retaining lugs 45 in entirely spaced relation to the wheel inclusive of the wheel body and the tire rim.

As clearly shown in FIGURE 4, the material of the cover between the shoulders 42 and 47 is spaced from the head 44 whereby to avoid interference with gripping engagement of said cover shoulders with said head shoulders.

Attachment of the retaining lug members 45 to the tire rim is effected substantially the same as described in connection with the retaining lug members 23. That is, body flange portions axially inwardly from the shouldered heads 44 of the lugs are secured as by welding or the like to the inner face of the intermediate flange 11, and generally undercut, grooved, complementary surfaces 50 at the radially outer side of the head portions of the lugs 45 engage in generally hugging, axial disposition orienting relation with the tire rim flange juncture shoulder 13. In the fully assembled relationship with the tire rim, it may be noted that the ridge of the juncture 13 and the maximum axially outwardly and radially inward projection of the crown of the head 44 are substantially on a common axis. To this axis the oblique slant of the cover portion 39 is preferably substantially normal. This facilitates resilient camming of the shoulders 42 of the cover over the respective lug heads 44 by resilient yielding or deflection of the cover portion 39 incident to press-on and pry-off manipulations of the cover.

Application of the cover 35 to the outer side of the wheel is effected substantially as described in connection with the cover 5, that is a valve stem aperture (not shown) is registered with a valve stem and the cover then pressed axially inward into retained position wherein it is entirely supported free from the wheel inclusive of the tire rim 8 by the head portions 44 of the retaining lugs, and with a gap between the cover portion 39 and the shoulder 13 of the tire rim enabling escape of dirt and water from behind the cover in service.

For removing the cover 35 from the wheel, a pry-off tool may be inserted behind the cover marginal portion 40 and pry-off tool leverage exerted against the seating shoulder 47 at any one of the retaining lugs.

Turning of the cover 35 on the wheel is precluded by the opposition of side shoulders 51 defining the respective socket embossments 43 with the sides of the retaining and supporting heads 44 of the retaining lugs.

It will be understood that modifications and variations may be effected without departing from the scope of the novel concepts of the present invention.

I claim as my invention:

1. In a wheel structure including a wheel body and a tire rim supported thereby and having a generally radially inwardly facing annular intermediate flange merging on a rounded shoulder juncture with a terminal flange that projects generally radially outwardly therefrom and then is turned generally axially outwardly at its lip extremity, means for retaining a cover on the outer side of the wheel comprising a retaining lug having a face substantially hugging said juncture shoulder and the adjacent portion of the intermediate flange and secured rigidly thereto, said retaining lug having a retaining head opposite said rim shoulder juncture and projecting generally radially inwardly and providing a generally radially and axially inwardly facing retaining shoulder, said lug face in the head portion thereof being conformed complementary to the rounded rim shoulder juncture to provide a locating and rim shoulder engaging groove surface, said retaining lug having axially inwardly from the shoulder head thereof a body flange of substantially reduced thickness compared to the thickness of said head but projecting radially inwardly substantially from the adjacent radially inwardly facing surface of the intermediate flange to provice a frictional interlock shoulder engageable by a cover bead, said frictional interlock shoulder having at the circumferentially opposite sides of said body flange sharp substantially biting corners for engaging the cover head.

2. In a wheel structure including a tire rim having a generally radially inwardly facing intermediate flange joining a generally radially and axially outwardly turned terminal flange on a turned juncture shoulder, a plurality of circumferentially spaced cover retaining lugs nested against said juncture shoulder with head portions thereof engaging against the axially outer side of said juncture shoulder and having body portions thereof secured to the intermediate flange, each of said lugs providing a generally radially and axially inwardly facing cover retaining shoulder, and a cover for disposition at the outer side of the wheel having a marginal portion for overlying the tire rim and provided therebehind with a continuous annular axially inwardly extending resilient flange provided with a turned terminal retainingly engageable in press-on, pry-off relation with said retaining shoulders of the retaining lugs, said retaining lugs having axially inwardly from the retaining shoulders thereof frictional anti-rotation interlock shoulders that are offset radially inwardly from the adjacent face of the intermediate flange, said retaining terminal being placed under resiliently inward deflection in engagement with said interlock shoulders with the intermediate portions of the terminal being deflected radially outwardly, said interlock shoulders having at the circumferentially opposite sides thereof sharp biting corners that interengage with the retaining terminal.

3. In a wheel structure including a tire rim having an intermediate generally radially inwardly facing flange and a terminal flange at the axially outer side of said intermediate flange joined to the intermediate flange by a turned generally radially inwardly and axially outwardly facing shoulder, a cover retaining rigid lug having a generally axially extending thick plate body portion of substantial width secured to the radially inner face of the intermediate flange and provided on the axially outer end thereof with a cover retaining head in the form of a generally radially inwardly projecting and circumferentially elongated rib, the head having at the radially outer side thereof a generally fillet-like circumferentially extending groove nestingly engaging the rim juncture shoulder and thereby orienting the lug member with respect to its axial disposition relative to the tire rim, and means securing said lug body to the intermediate flange.

4. In a wheel structure including a tire rim having an intermediate generally radially inwardly facing flange and a terminal flange at the axially outer side of said intermediate flange joined to the intermediate flange by a turned generally radially inwardly and axially outwardly facing shoulder, a cover retaining rigid lug having a generally axially extending thick plate body portion of substantial width secured to the radially inner face of the intermediate flange and provided on the axially outer end thereof with a cover retaining head in the form of a generally radially inwardly projecting and circumferentially elongated rib, the head having at the radially outer side thereof a generally fillet-like circumferentially extending groove nestingly engaging the rim juncture shoulder and thereby orienting the lug member with respect to its axial disposition relative to the tire rim, means securing said lug body to the intermediate flange, said head having abrupt circumferentially facing shoulders at the opposite ends of the head rib engageable with opposing shoulders of a cover to hold the cover against turning.

5. In a wheel structure including a wheel body and a tire rim supported thereby and having a generally radially inwardly facing annular intermediate flange merging on a shoulder juncture with a terminal flange that projects generally radially outwardly therefrom and then is turned generally axially outwardly at its lip extremity, means for retaining a cover on the outer side of the wheel comprising a retaining lug substantially hugging said juncture shoulder and the adjacent portion of the intermediate flange and secured rigidly thereto, said retaining lug having a retaining head opposite said rim shoulder juncture and projecting generally radially inwardly and providing a generally radially and axially inwardly facing retaining shoulder, said head having a crown shoulder on the opposite side thereof from and spaced radially and axially outwardly relative to said retaining shoulder and having the maximum radially inwardly and axially outward projection thereof substantially on a common axis through the maximum radially inward and axially outward peak projection of said flange juncture shoulder, and a cover for disposition at the outer side of the wheel having intermediately of a generally radially and axially outwardly extending annular flange portion thereof shoulders opposing one another in radially and axially spaced relation complementary to and engageable with respectively the retaining shoulder and the crown shoulder of said shouldered head, the material of the cover between the cover shoulders being spaced from said head whereby to avoid interference with gripping engagement of said cover shoulders with said head shoulders.

6. In a wheel structure including a tire rim having an intermediate generally radially inwardly facing flange and a terminal flange at the axially outer side of said intermediate flange joined to the intermediate flange by a turned generally radially inwardly and axially outwardly facing shoulder, a cover retaining lug having a generally axially extending body portion of substantial width secured to the radially inner face of the intermediate flange and provided on the axially outer end thereof with a cover retaining head in the form of a generally radially inwardly projecting and circumferentially elongated rib, the head having at the radially outer side thereof a generally fillet-like circumferentially extending groove nestingly engaging the rim juncture shoulder and thereby orienting the lug member with respect to its axial disposition relative to the tire rim, means securing said lug body to the intermediate flange, said head having abrupt circumferentially facing shoulders at the opposite ends of the head rib, and a cover for press-on, pry-off interengagement with said cover retaining lug head and having a portion thereof provided with a generally radially outwardly opening recess within which said head is engaged in cover retaining relation, said recess having respective shoulders opposing said circumferentially facing shoulders of the head to hold the cover against turning.

References Cited in the file of this patent

UNITED STATES PATENTS

| | | |
|---|---|---|
| 2,113,541 | Black | Apr. 5, 1938 |
| 2,263,243 | Lyon | Nov. 18, 1941 |
| 2,561,160 | Weasler | July 17, 1951 |
| 2,607,633 | Lyon | Aug. 19, 1952 |
| 2,621,978 | Lyon | Dec. 16, 1952 |
| 2,631,066 | Horn | Mar. 10, 1953 |
| 2,860,923 | Lyon | Nov. 18, 1958 |

FOREIGN PATENTS

| | | |
|---|---|---|
| 1,100,164 | France | Mar. 30, 1955 |